US011537811B2

United States Patent
Shen et al.

(10) Patent No.: US 11,537,811 B2
(45) Date of Patent: Dec. 27, 2022

(54) ENHANCED OBJECT DETECTION FOR AUTONOMOUS VEHICLES BASED ON FIELD VIEW

(71) Applicant: Tesla, Inc., Palo Alto, CA (US)

(72) Inventors: Anting Shen, Mountain View, CA (US); Romi Phadte, Mountain View, CA (US); Gayatri Joshi, Mountain View, CA (US)

(73) Assignee: Tesla, Inc., Austin, TX (US)

( * ) Notice: Subject to any disclaimer, the term of this patent is extended or adjusted under 35 U.S.C. 154(b) by 500 days.

(21) Appl. No.: 16/703,660

(22) Filed: Dec. 4, 2019

(65) Prior Publication Data

US 2020/0175326 A1 Jun. 4, 2020

Related U.S. Application Data

(60) Provisional application No. 62/775,287, filed on Dec. 4, 2018.

(51) Int. Cl.
*G06K 9/20* (2006.01)
*G06K 9/62* (2022.01)
*G05D 1/00* (2006.01)
*G05D 1/02* (2020.01)

(52) U.S. Cl.
CPC ......... *G06K 9/6228* (2013.01); *G05D 1/0088* (2013.01); *G05D 1/0251* (2013.01); *G05D 1/0253* (2013.01); *G05D 2201/0213* (2013.01)

(58) Field of Classification Search
CPC .. G06K 9/6228; G06K 9/6292; G05D 1/0088; G05D 1/0251; G05D 1/0253; G05D 2201/0213; G06V 10/25; G06V 10/809; G06V 20/58

USPC ......................................................... 382/282
See application file for complete search history.

(56) References Cited

U.S. PATENT DOCUMENTS

| | | | |
|---|---|---|---|
| 6,882,755 B2 | 4/2005 | Silverstein et al. |
| 7,209,031 B2 | 4/2007 | Nakai et al. |
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |

(Continued)

FOREIGN PATENT DOCUMENTS

| | | | |
|---|---|---|---|
| AU | 2019261735 A1 | 6/2020 |
| AU | 2019201716 A1 | 10/2020 |

(Continued)

*Primary Examiner* — Mahendra R Patel
(74) *Attorney, Agent, or Firm* — Knobbe, Martens, Olson & Bear, LLP

(57) ABSTRACT

Systems and methods for enhanced object detection for autonomous vehicles based on field of view. An example method includes obtaining an image from an image sensor of one or more image sensors positioned about a vehicle. A field of view for the image is determined, with the field of view being associated with a vanishing line. A crop portion corresponding to the field of view is generated from the image, with a remaining portion of the image being downsampled. Information associated with detected objects depicted in the image is outputted based on a convolutional neural network, with detecting objects being based on performing a forward pass through the convolutional neural network of the crop portion and the remaining portion.

20 Claims, 6 Drawing Sheets

(56) References Cited

U.S. PATENT DOCUMENTS

| | | |
|---|---|---|
| 8,369,633 B2 | 2/2013 | Lu et al. |
| 8,406,515 B2 | 3/2013 | Cheatle et al. |
| 8,509,478 B2 | 8/2013 | Haas et al. |
| 8,588,470 B2 | 11/2013 | Rodriguez et al. |
| 8,744,174 B2 | 6/2014 | Hamada et al. |
| 8,773,498 B2 | 7/2014 | Lindbergh |
| 8,912,476 B2 | 12/2014 | Fogg et al. |
| 8,913,830 B2 | 12/2014 | Sun et al. |
| 8,928,753 B2 | 1/2015 | Han et al. |
| 8,972,095 B2 | 3/2015 | Furuno et al. |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | McCarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy et al. |
| 10,167,800 B1 | 1/2019 | Chung et al. |
| 10,169,680 B1 * | 1/2019 | Sachdeva .............. G06T 7/174 |
| 10,192,016 B2 | 1/2019 | Ng et al. |
| 10,216,189 B1 | 2/2019 | Haynes |
| 10,228,693 B2 | 3/2019 | Micks et al. |
| 10,242,293 B2 | 3/2019 | Shim et al. |
| 10,248,121 B2 | 4/2019 | VandenBerg, III |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel et al. |
| 10,310,087 B2 | 6/2019 | Laddha et al. |
| 10,311,312 B2 | 6/2019 | Yu et al. |
| 10,318,848 B2 | 6/2019 | Dijkman et al. |
| 10,325,178 B1 | 6/2019 | Tang et al. |
| 10,331,974 B2 | 6/2019 | Zia et al. |
| 10,338,600 B2 | 7/2019 | Yoon et al. |
| 10,343,607 B2 | 7/2019 | Kumon et al. |
| 10,359,783 B2 | 7/2019 | Williams et al. |
| 10,366,290 B2 | 7/2019 | Wang et al. |
| 10,372,130 B1 | 8/2019 | Kaushansky et al. |
| 10,373,019 B2 | 8/2019 | Nariyambut Murali et al. |
| 10,373,026 B1 | 8/2019 | Kim et al. |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp et al. |
| 10,423,934 B1 | 9/2019 | Zanghi et al. |
| 10,436,615 B2 | 10/2019 | Agarwal et al. |
| 10,452,905 B2 | 10/2019 | Segalovitz et al. |
| 10,460,053 B2 | 10/2019 | Olson et al. |
| 10,467,459 B2 | 11/2019 | Chen et al. |
| 10,468,008 B2 | 11/2019 | Beckman et al. |
| 10,468,062 B1 | 11/2019 | Levinson et al. |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | Sivakumar et al. |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez et al. |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neuman |
| 10,565,475 B2 | 2/2020 | Lecue et al. |
| 10,567,674 B2 | 2/2020 | Kirsch |
| 10,568,570 B1 | 2/2020 | Sherpa et al. |
| 10,572,717 B1 | 2/2020 | Zhu et al. |
| 10,574,905 B2 | 2/2020 | Srikanth et al. |
| 10,579,058 B2 | 3/2020 | Oh et al. |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tull et al. |
| 10,609,434 B2 | 3/2020 | Singhai et al. |
| 10,614,344 B2 | 4/2020 | Anthony et al. |
| 10,621,513 B2 | 4/2020 | Deshpande et al. |
| 10,627,818 B2 | 4/2020 | Sapp et al. |
| 10,628,432 B2 | 4/2020 | Guo et al. |
| 10,628,686 B2 | 4/2020 | Ogale et al. |
| 10,628,688 B1 | 4/2020 | Kim et al. |
| 10,629,080 B2 | 4/2020 | Kazemi et al. |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang et al. |
| 10,656,657 B2 | 5/2020 | Djuric et al. |
| 10,657,391 B2 | 5/2020 | Chen et al. |
| 10,657,418 B2 | 5/2020 | Marder et al. |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 * | 8/2020 | Liao .......................... G06T 7/73 |
| 10,733,876 B2 | 8/2020 | Moura et al. |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |

(56) References Cited

U.S. PATENT DOCUMENTS

| | | |
|---|---|---|
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 * | 10/2020 | Bai .................. G06N 3/04 |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 * | 11/2020 | Xiao .................. G06N 3/00 |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2009/0016571 A1 | 1/2009 | Tijerina et al. |
| 2010/0118157 A1 | 5/2010 | Kameyama |
| 2012/0109915 A1 | 5/2012 | Kamekawa |
| 2012/0110491 A1 | 5/2012 | Cheung |
| 2012/0134595 A1 | 5/2012 | Fonseca et al. |
| 2015/0104102 A1 | 4/2015 | Carreira et al. |
| 2016/0132786 A1 | 5/2016 | Balan et al. |
| 2016/0328856 A1 | 11/2016 | Mannino et al. |
| 2017/0011281 A1 * | 1/2017 | Dijkman .............. G06V 30/194 |
| 2017/0158134 A1 | 6/2017 | Shigemura |
| 2017/0185872 A1 * | 6/2017 | Chakraborty .......... G06V 20/52 |
| 2017/0206434 A1 | 7/2017 | Nariyambut et al. |
| 2018/0012411 A1 | 1/2018 | Richey et al. |
| 2018/0018590 A1 | 1/2018 | Szeto et al. |
| 2018/0039853 A1 | 2/2018 | Liu et al. |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0121762 A1 | 5/2018 | Han et al. |
| 2018/0150081 A1 | 5/2018 | Gross et al. |
| 2018/0211403 A1 | 7/2018 | Hotson et al. |
| 2018/0308012 A1 | 10/2018 | Mummadi et al. |
| 2018/0314878 A1 | 11/2018 | Lee et al. |
| 2018/0357511 A1 | 12/2018 | Misra et al. |
| 2018/0374105 A1 | 12/2018 | Azout et al. |
| 2019/0023277 A1 | 1/2019 | Roger et al. |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 * | 5/2019 | Homayounfar ........ G06N 20/00 |
| | | 701/23 |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |

(56) References Cited

U.S. PATENT DOCUMENTS

| | | |
|---|---|---|
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzacieh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0325746 A1* | 10/2019 | Lewis ................. G01C 21/3453 |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | England et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |

(56) References Cited

U.S. PATENT DOCUMENTS

| | | |
|---|---|---|
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1* | 1/2021 | McGavran .......... G01C 21/3453 |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |

FOREIGN PATENT DOCUMENTS

| | | | |
|---|---|---|---|
| CA | 2739989 A1 * | 4/2010 | .......... G01S 17/023 |
| CN | 100367314 C * | 2/2008 | .............. B60R 1/00 |
| CN | 110599537 A | 12/2010 | |
| CN | 102737236 A | 10/2012 | |
| CN | 103366339 A | 10/2013 | |
| CN | 104835114 A | 8/2015 | |
| CN | 103236037 B | 5/2016 | |
| CN | 103500322 B | 8/2016 | |
| CN | 106419893 A | 2/2017 | |
| CN | 106504253 A | 3/2017 | |
| CN | 107031600 A | 8/2017 | |
| CN | 107169421 A | 9/2017 | |
| CN | 107507134 A | 12/2017 | |
| CN | 107885214 A | 4/2018 | |
| CN | 108122234 A | 6/2018 | |
| CN | 107133943 B | 7/2018 | |
| CN | 107368926 B | 7/2018 | |
| CN | 105318888 B | 8/2018 | |
| CN | 108491889 A | 9/2018 | |
| CN | 108647591 A | 10/2018 | |
| CN | 108710865 A | 10/2018 | |
| CN | 105550701 B | 11/2018 | |
| CN | 108764185 A | 11/2018 | |
| CN | 108845574 A | 11/2018 | |
| CN | 108898177 A | 11/2018 | |
| CN | 109086867 A | 12/2018 | |
| CN | 107103113 B | 1/2019 | |
| CN | 109215067 A | 1/2019 | |
| CN | 109359731 A | 2/2019 | |
| CN | 109389207 A | 2/2019 | |

(56) References Cited

FOREIGN PATENT DOCUMENTS

| | | |
|---|---|---|
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 110069071 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102017116017 A1 | 1/2019 |
| DE | 102018130821 A1 | 6/2020 |
| DE | 102019008316 A1 | 8/2020 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3115772 A1 | 1/2017 |
| EP | 2618559 B1 | 8/2017 |
| EP | 3285485 A1 | 2/2018 |
| EP | 2863633 B1 | 2/2019 |
| EP | 3113080 B1 | 5/2019 |
| EP | 3525132 A1 | 8/2019 |
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |
| GB | 2548087 A | 9/2017 |
| GB | 2577485 A | 4/2020 |
| GB | 2517270 B | 6/2020 |
| JP | 2578262 Y2 | 8/1998 |
| JP | 3890996 B2 * | 3/2007 ........... G01S 17/023 |
| JP | 3941252 B2 | 7/2007 |
| JP | 4282583 B2 | 6/2009 |
| JP | 4300098 B2 | 7/2009 |
| JP | 2015004922 A | 1/2015 |
| JP | 5863536 B2 | 2/2016 |
| JP | 6044134 B2 | 12/2016 |
| JP | 2017122713 A * | 7/2017 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 101738422 B1 | 5/2017 |

(56) References Cited

FOREIGN PATENT DOCUMENTS

| | | |
|---|---|---|
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 02/052835 | 7/2002 |
| WO | WO 16/032398 | 3/2016 |
| WO | WO 16/048108 | 3/2016 |
| WO | WO 16/207875 | 12/2016 |
| WO | WO-2017007626 A1 * | 1/2017 ......... G06K 9/00684 |
| WO | WO-2017116635 A1 * | 7/2017 ......... G06K 9/00771 |
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

* cited by examiner

ENHANCED OBJECT DETECTION FOR AUTONOMOUS VEHICLES BASED ON FIELD VIEW

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Disclosure

This application relates generally to the machine vision field, and more specifically to enhanced objection detection from a vehicle.

Description of the Related Art

In the field of machine vision for autonomous vehicles, object detection is a computationally intensive task. Typically, the resolution of an image is sent as input to a detector, and the detector consistently detects pixel size. Most detectors have a minimum number of pixels that are required as input for a detector to detect objects within the image. For example, many detectors require at least forty pixels in the image in order to detect objects. The computational complexity required for a detector scales directly with the number of pixels being fed into the detector. If twice the number of pixels are fed into the detector as input, then the detector will typically take twice as long to produce an output.

Out of necessity and lack of computational resources within autonomous vehicles, in order to address this high computational requirement, object detectors nearly always perform their processing tasks using downsampled images as input. Downsampling of high resolution images is a technique that lowers the high computational requirement for image processing by creating an access image that is a miniaturized duplicate of the optical resolution master image, typically outputted from an automotive camera. While computational requirements are lowered, downsampling these images reduces the range, or distance, of detections due to the fewer number of pixels that are acted upon by the detector. For width and height, for example, the detector may process the image four times as fast, but objects such as cars will be smaller in the downsized image and will need to be twice as close in the camera for them to be the same pixel size, depending on the camera and its field of view (hereinafter "FOV").

As a result, accurate detectors are slower than is typically desirable due to the high computational requirements, while faster detectors using downsampled images are not as accurate as typically desired.

DETAILED DESCRIPTION

Figure 1:
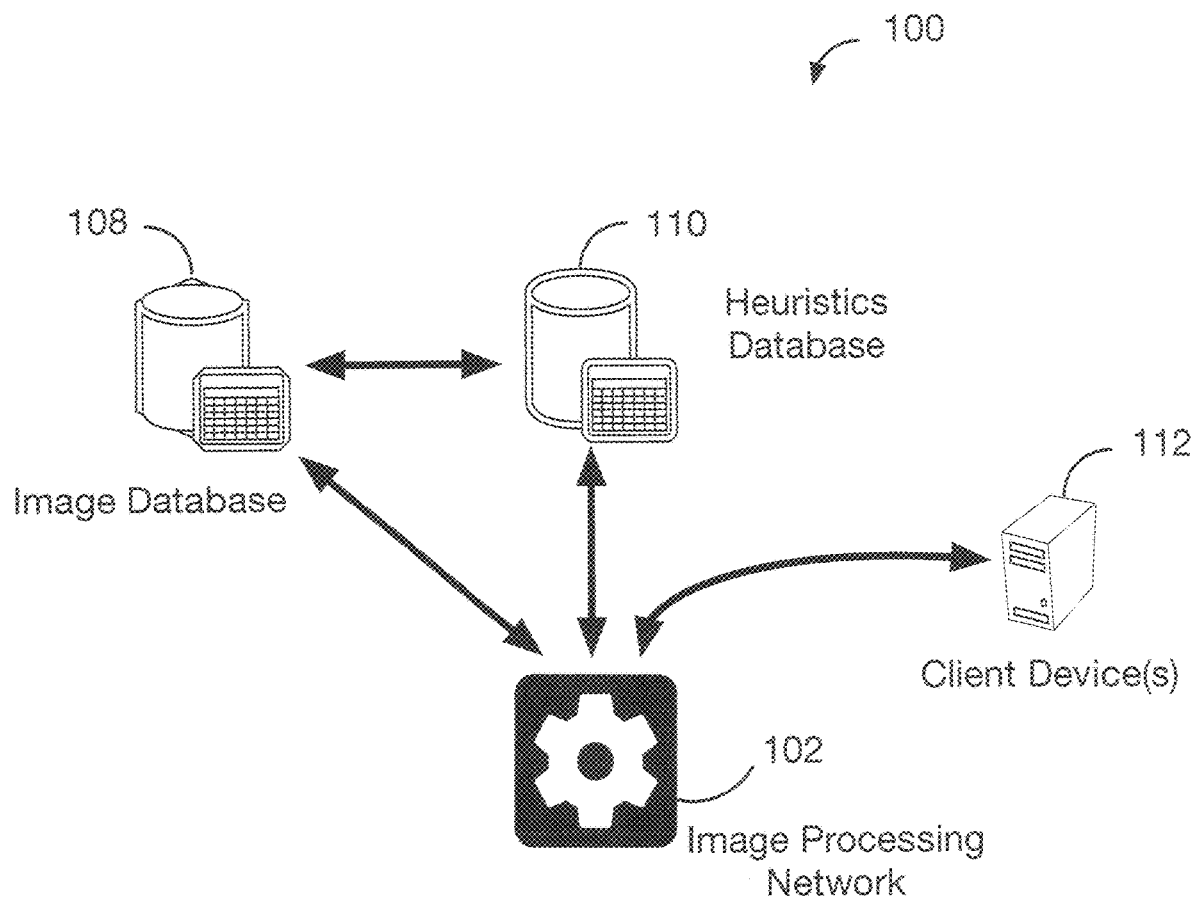
FIG. 1 is a schematic representation of the object detection system.

Although some embodiments described throughout generally relate to systems and methods for object detection, it will be appreciated by those skilled in the art that the systems and methods described can be implemented and/or adapted for a variety of purposes within the machine vision field, including but not limited to: semantic segmentation, depth estimation, three-dimensional bounding box detection, object re-identification, pose estimation, action classification, simulation environment generation, and sensor fusion.

Embodiments relate to techniques for increasing accuracy of object detection within particular fields of view. As described herein, one or more image sensors (e.g., cameras) may be positioned about a vehicle. For example, there may be 4, 6, 9, and so on, image sensors positioned at different locations on the vehicle. Certain image sensors, such as forward facing image sensors, may thus obtain images of a real-world location towards which the vehicle is heading. It may be appreciated that a portion of these images may tend to depict pedestrians, vehicles, obstacles, and so on that are important in applications such as autonomous vehicle navigation. For example, a portion along a road on which the vehicle is driving may tend to depict other vehicles. As another example, a portion associated with a horizon line or vanishing line may tend to depict other vehicles on a road. As will be described, this portion may be determined by a system. As an example, a particular field of view corresponding to this portion may be determined.

Upon determination, the particular field of view may be cropped from an input image. A remaining portion of the input image may then be downsampled. The relatively high resolution cropped portion of the input image and the lower resolution downsampled portion of the input image may then be analyzed by an object detector (e.g., a convolutional neural network). In this way, the object detector may expend greater computational resources analyzing the higher resolution particular field of view at the vanishing line which is more likely to have important features. Additionally, with the greater detail in the cropped portion the system may more reliably detect objects, avoid false positives, and so on.

Overview

In one embodiment, a method for object detection includes: receiving one or more pieces of data relating to a high resolution image; determining a field of view (FOV) based on the pieces of data; cropping the FOV to generate a high resolution crop of the image; downsampling the rest of the image to the size of the cropped region to generate a low resolution image; sending a batch of the high resolution crop and the low resolution image to a detector; and processing the images via the detector to generate an output of detected objects.

The method may function to provide a deep learning based image processing and object detection system that determines a field of view and combines a cropped field of view image with a downsampled image to perform object detection on an image that is both low compute and long range. By processing a batched image of a cropped field of view and a non-cropped, downsampled image, the object detector can detect and identify faraway objects in the narrow field of vision of the cropped image, and also identify closer objects in the wider field of vision of the downsampled, non-cropped image. The detected objects and/or parameters thereof (e.g., distance, dimensions, pose, classification, etc.) can be used in: navigation, mapping, or otherwise used. The method can be applied to: every frame, every N frames (e.g., where N can be predetermined or dynamically determined), a randomly selected set of frames, or any other suitable set of frames. The method is preferably performed in real time (e.g., as the vehicle is driving), but can alternatively be performed asynchronously with vehicle operation or at any suitable time.

In one variation, the method uses inertial measurement unit ("IMU") data or gyroscope data to determine a horizon line, then uses map data and compass data to determine a vehicle heading and future road direction. Once an image is received, it is cropped according to where the road or vehicle is expected to be at some predefined distance (e.g., 100 m, 200 m, etc.) or a predefined time (e.g., 30 seconds, 1 minute, etc.). The cropped image and a downsampled version of the original image are batched and run through the detector, and the boxes of both are combined by scaling them. Object detection is performed on the resulting image.

Additionally, in some embodiments a horizon line, or other field of view, may be assigned as a center third portion of an image. For example, along a vertical direction a center third of the image may be cropped. In this example, the cropped image may thus extend from a left to a right of the image along a horizontal axis and represent a central third of the image. Optionally, the cropped image may extend a threshold distance along the horizontal axis. For example, a portion of the image which depicts a road may be identified. In this example, the cropped image may thus extend along a horizontal axis for portions of the image depicting the road or a portion thereof (e.g., one or more lanes along a direction a travel). While a third is described above, it may be appreciated that the percentage of the image cropped may be adjusted. For example, a central fourth of the image may be taken. As another example, a machine learning model may be used to identify a particular strip along a horizontal axis of the image which corresponds to a horizon or other vanishing line. In some embodiments, map data may be used. For example, using map data it may be determined that a road on which a vehicle is driving may turn. Thus, as the road turns the cropped images may represent the turning road. As an example, an offset left or right, or up or down for an incline or decline, may be used based on the map data.

All or portions of the method can be performed at a predetermined frequency, performed upon occurrence of an execution event (e.g., upon an autonomous vehicle engaging in driving), or performed at any suitable time. All or portions of the method are preferably performed on-board the vehicle (e.g., at an on-board processing system, such as an embedded processor, microprocessor, CPU, GPU, etc.), but can additionally or alternatively be performed in a remote computing system, at a user device, or at any other suitable computing system. For example, low latency processes (e.g., object detection) can be performed on-board the vehicle, while high latency processes (e.g., model training) can be performed at the remote computing system. However, the system processes can be otherwise determined.

System

As shown in FIG. 1, the image processing system 100 can include: an image processing network 102 an image database 108, a heuristics database 110, and a client device or devices 112. In some embodiments, the image processing network 102 includes one or more deep neural networks, more preferably convolutional neural networks (CNNs) but can alternatively include recurrent neural networks (RNN) or any other suitable method, that process images in conjunction with an image processor. In some embodiments, processing images includes one or more of image classification, object detection, and object tracking.

In some embodiments, the image processing network 102 includes an object detector. In some embodiments, the image processing network 102 receives images in the form of a series of video or image frames from a camera. In some embodiments, the camera is an automotive camera placed within an autonomous vehicle for machine vision purposes (e.g., an exterior or interior of the vehicle), such as detecting objects on the road, or other real-world area, during the car's operation and predicting locations of objects in future frames based on the locations of the objects in current and past frames.

Image database 108 stores the frames from the camera as they are outputted from the camera and sent to the image processing system 100. Image database 108 may be located on-board the vehicle, but can alternatively or additionally be located or replicated in a remote computing system. Image database 108 can be a circular buffer, a relational database, a table, or have any other suitable data structure.

Heuristics database 110 stores one or more heuristics for determining a field of view for a given image. However, the system can additionally or alternatively include databases or modules that leverage other methodologies for priority field-of view determination (e.g., classifiers such as Baysean classifiers, support vector machines, etc.).

In one variation, the priority field of view (priority FOV) is the portion of the image representing the road section located a predetermined distance away from the vehicle or image sampling device (e.g., one or more cameras), wherein the heuristics database stores a set of heuristics (e.g., rules, algorithms) to identify the desired field of view. The FOV may also be associated with a horizon line or vanishing line. The horizon line or vanishing line may be depicted in the image, or may be inferred in the image. For example, the horizon or vanishing line may identified based on projecting in the image a road or surface on which the vehicle is being driven. The priority FOV preferably has a predetermined dimension (e.g., 640×360 px; 360×360 px; 640×640 px; etc.), but can alternatively or additionally have dimensions that are dynamically adjusted based on vehicle operation parameters (e.g., location, kinematics, ambient light conditions, weather, etc.). The priority FOV is preferably a section of the sampled image, wherein the section location on the image is selected using the priority FOV image region selection methods stored by the heuristics database, but can be otherwise located.

Examples of priority FOV image region selection methods that can be used include: storing a database of predetermined image regions for each of a combination of horizon locations, vehicle headings, and future road directions and selecting the priority FOV image region from the database; storing a predetermined image region for each of a plurality of geographic vehicle locations, wherein the priority FOV image region is selected based on the vehicle location; storing an equation for determining or adjusting the priority FOV image region (e.g., within the larger image) based on vehicle heading and/or kinematics; or other image selection methods. However, the priority FOV image region can be selected or identified using image-only based rules, attention-based networks, or a combination of the above, or otherwise selected.

In this example, the heuristics database can optionally include: horizon detection method(s); vehicle heading determination methods; future road direction determination methods; and/or any other suitable methods.

Examples of horizon detection methods that can be used include: edge detectors (e.g., applied to a predetermined section of the image), a database mapping the vehicle location to an expected horizon location within the image (e.g., wherein the database can be specific to the extrinsic and/or intrinsic camera parameters), or any other suitable horizon detector.

Examples of vehicle heading determination methods that can be used include: on-board compass interpretation, odometry, or any other suitable set of determination methods.

Examples of future road direction determination methods that can be used include: identifying the pose of a road section located a predetermined distance away from the vehicle based on a predetermined map (e.g., from OpenStreetMaps, a crowdsourced map, etc.), vehicle navigation instructions or historic vehicle routes, the vehicle location (e.g., determined using GPS, dead reckoning, etc.), and/or vehicle kinematic data (e.g., IMU data, vehicle velocity, vehicle acceleration, etc.); determining the road direction using a neural network (e.g., a DNN, etc.); or otherwise determining the future road direction.

In one embodiment, the client device(s) 112 are devices that send information to the image processing network 102, receive information from the image processing network 102, or both. A client device may include, for example, one or more components of an autonomous vehicle, or a computer device associated with one or more users, organizations, or other entities.

Method

Figure 2:
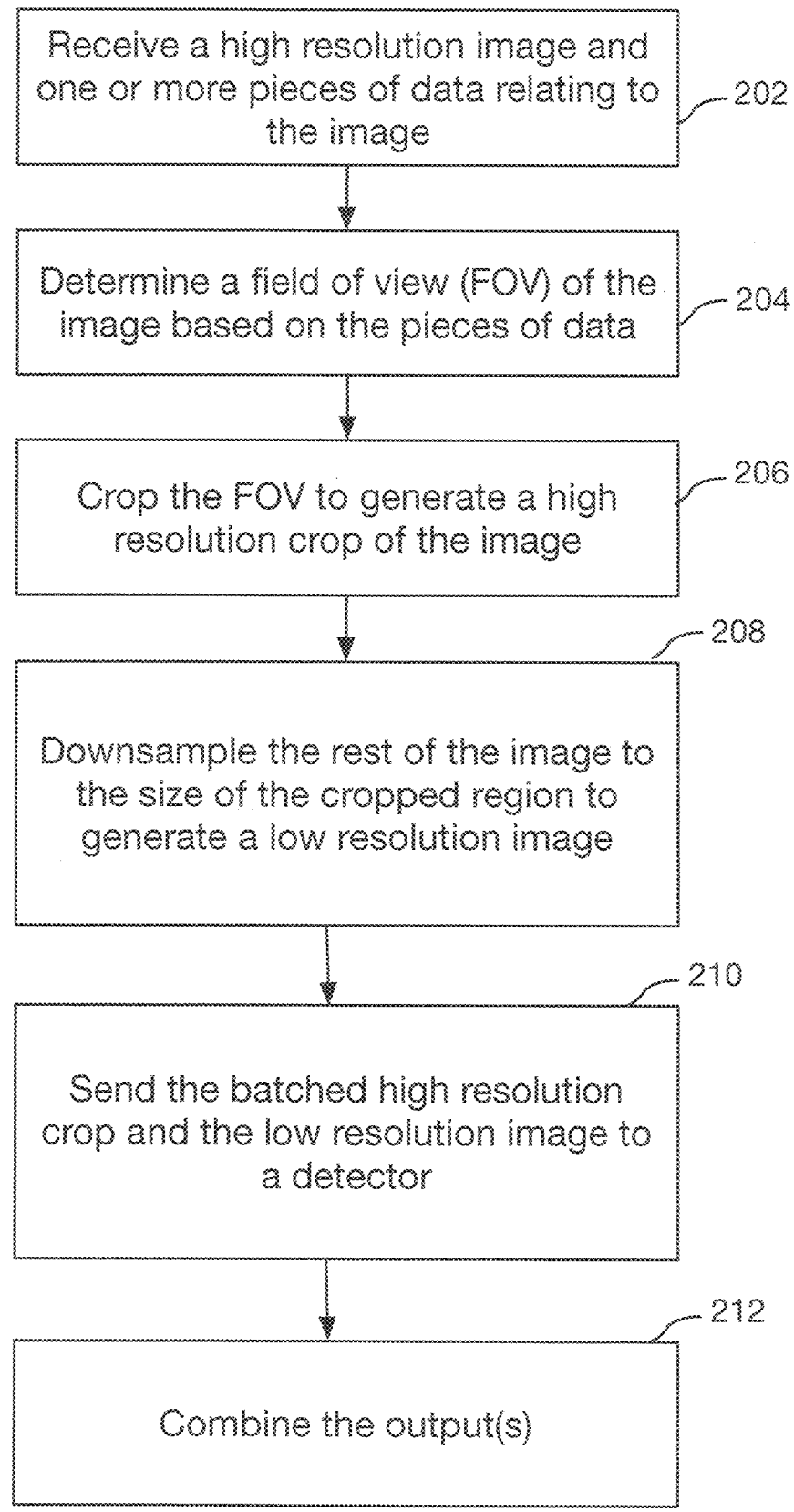
FIG. 2 is a flowchart representation of the object detection method.

FIG. 2 is a flowchart representation of one embodiment of an object detection method.

Figure 4:
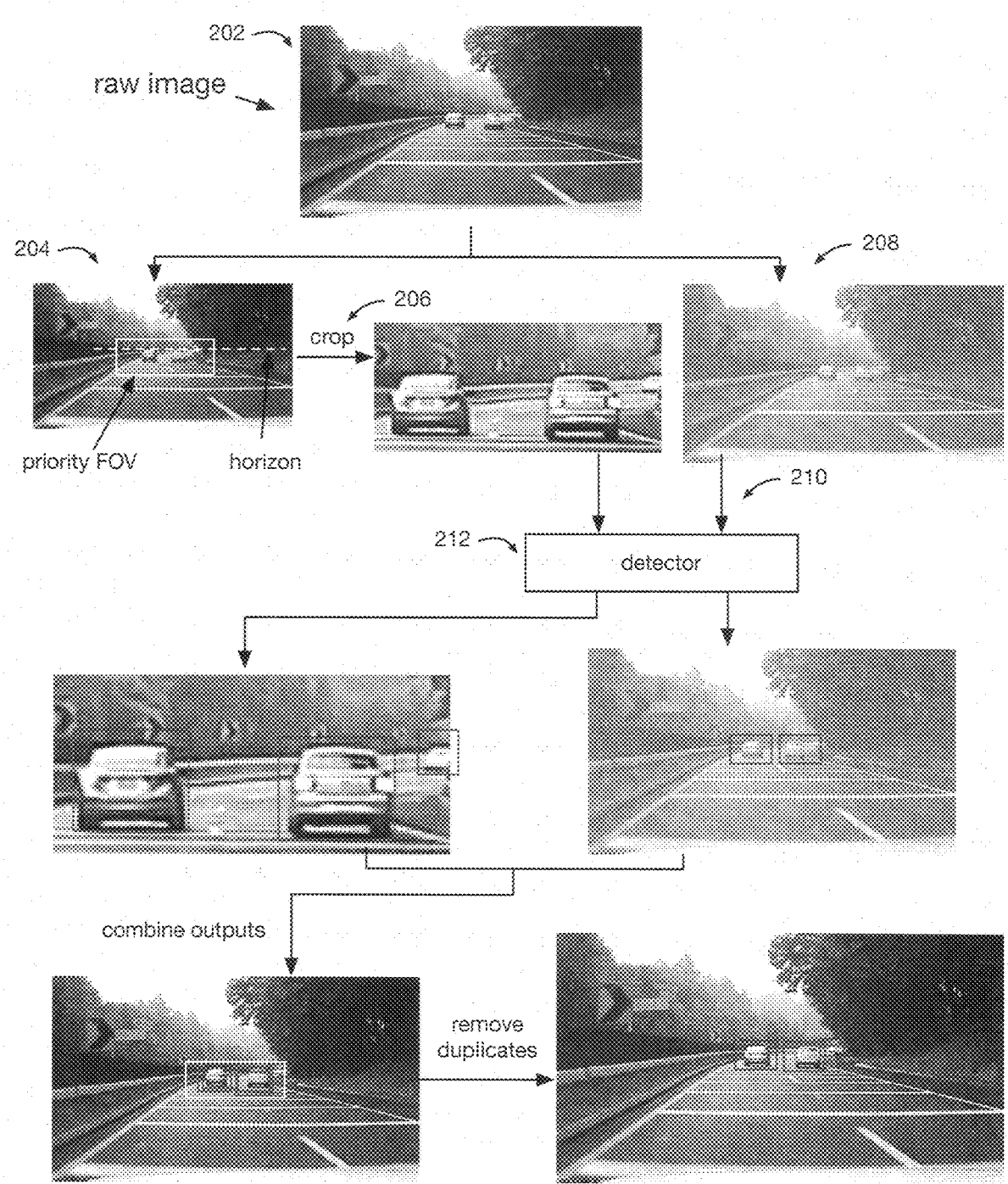
FIG. 4 is a schematic representation of an example of the method.

At step 202, system 100 receives a high resolution image and one or more pieces of data relating to the image (e.g., as illustrated in FIG. 4). In some embodiments, the high resolution image is a frame or image generated as the output of a camera. In some embodiments, the camera is an automotive camera on an autonomous vehicle configured to be used for object detection tasks, such as detecting the presence of cars or other objects on the road during the autonomous vehicle's operation. The camera can be a CCD sensor, CMOS sensor, or any other suitable image sensor. The camera is preferably a monocular camera, but can alternatively be a stereoscopic system or be any other suitable camera. The high resolution image of any size can be any sufficiently high resolution for an image given technology available (e.g., a resolution greater than a threshold). For example, a 1920×1080 image may be sufficiently large enough and/or have sufficiently high resolution for many applications relating to autonomous vehicles currently.

In some embodiments, the one or more pieces of data relating to the image can include data from an inertial measurement unit (IMU) or gyroscope data relating to the image, map data and compass data relating to the image, location data, camera type, image resolution, image dimensions, number of pixels in the image, and other conceivable data and/or metadata relating to the image. In some embodiments, the pieces of data relate to the field of view of the image. In some embodiments, the pieces of data are generated by multiple sensors. For example, an autonomous vehicle can have multiple sensors generated a wide variety of data on the vehicle's location, orientation, projected direction, and more.

At step 204, system 100 determines a priority field of view (FOV) of the image based on the received pieces of data (example shown in FIG. 4). In some embodiments, system 100 determines the field of view based on a set of heuristics for determining field of view (e.g., selected from the heuristics database; determined using one or more priority FOV image region selection methods; etc.). The heuristics can constitute a set of rules, an executable method, algorithm, or other process that is followed by system 100 to determine the field of view. In varying embodiments, system 100 determines the field of view using probabilities, offline or online map data, sensor data such as IMU or gyroscope data, image-based rules, attention networks, or some combination thereof. In one embodiment, system 100 determines the horizon line in the image using one or more pieces of data relating to the image, then uses the horizon line location providing vertical orientation of the field of view to determine where objects, such as cars will be. System 100 can use car velocity, map data about lanes on roads, and/or other information to determine vertical orientation of the field of view. In some embodiments, radar and/or LIDAR data can be used for determining the field of view. In some embodiments, historical data on previous determinations of field of view can be used to determine the field of view of the current image. For example, if previous determinations showed areas more likely to have cars, then the presence of cars may be given weight in determining the field of view.

In some embodiments, system 100 determines a priority field of vision to predict where faraway objects, such as faraway cars on a road, are going to be located in the field of vision of the image (example shown in FIG. 4). In some embodiments, system 100 can determine the priority field of vision in a naive fashion, by taking the center of the image and classifying it as a priority field of vision. In other embodiments, system 100 determines the priority field of vision using other sensors in the autonomous vehicle, or using map data that provides information that the autonomous vehicle is driving on a curved road at a certain angle. In one example, the y-position of the priority FOV can be determined as a pixel distance, measured from the horizon or from the image bottom, corresponding to a road segment located a predetermined geographical distance away from the vehicle (e.g., wherein the pixel distance can be determined based on vehicle velocity). In this example, the x-position of the priority FOV can be determined based on the vehicle heading and the future road direction (e.g., wherein the x-position of the priority FOV encompasses the image representation of the road segment or other physical volume that the vehicle will travel through). However, the priority FOV position in the image can be otherwise determined.

At step 206, system 100 crops the priority FOV to generate a high resolution crop of the image (example shown in FIG. 4). As used herein, a "crop" is a predetermined segment or portion of the image. In some embodiments, system 100 crops, or removes outer areas from, the FOV to focus on the field of view in a higher resolution. In some embodiments, both horizontal field of view and vertical field of view are captured in the crop of the image. The high resolution crop preferably has the same resolution as the raw image, but can alternatively have a different resolution (e.g., be downsampled). The high resolution crop preferably has a high resolution, such as 300 DPI or above, but can alternatively or additionally be a crop saved in a non-lossy file format or a low compression format, or have any suitable set of characteristics.

At step 208, system 100 downsamples the rest of the image that was not part of the cropped portion. In some embodiments, the downsampled image may be set according to the size of the cropped region to generate a low resolution image (example shown in FIG. 4). In various embodiments, a wide variety of downsampling techniques and methods can be used to downsample the image, including but not limited to methods involving decimation, bilinear interpolation, Fourier transform, and neural networks. The two images generated at this point are a high resolution crop of the original image with a low field of vision, and a low resolution version of the original image with a large, downsampled field of vision. In some embodiments, the system 100 may assign a cropped portion of the image as depicting the field of view. Remaining portions of the image may be downsampled, such that one image may result. This one image may then be analyzed by a detector, as described below.

At step 210, system 100 sends a batched output of the high resolution crop and the low resolution image to a detector (e.g., running a deep learning neural network) (example shown in FIG. 4). For example, a forward pass through layers of the detector may be performed. In some embodiments, the detector is capable of one or more image processing tasks, such as object detection, object classification, and object location prediction. For example, the detector may classify objects, determine bounding boxes surrounding classified objects, determine location information for the classified objects (e.g., pixels forming the objects), and so on. In some embodiments, the two input images are of the same dimensions. In some embodiments, system 100 concatenates the two images along a fourth axis. This can be performed by multiplying large matrices representing the images. In some embodiments, the resulting output of the batching is a four-dimensional tensor. In some embodiments, the resulting output of the batching is fed into one or more neural networks, such as a deep convolutional neural network associated with the image processor, and used to train a data model for an image processing task or tasks, such as object detection and object location prediction.

At step 212, system 100 combines the batched output via the detector to generate a combined output of detected objects for each input image (e.g., each of the high resolution crop and the low resolution image) (example shown in FIG. 4). The output may be usable by the system 100, or another system of one or more processors, to drive, and/or otherwise control operation of, an autonomous vehicle. Any suitable set of object detectors can be used. The images (e.g., for the same frame) can be fed into the same detector, two parallel instances of the same detector, different detectors (e.g., one for the high-resolution crop, one for the low-resolution full image), or otherwise processed. The output may include a set of labeled boxes (windows) surrounding objects detected in each image (e.g., optionally labeled with the object class, object pose, or other object parameter), but can additionally or alternatively output: a 3D point cloud of objects, a set of pixels labeled with the object class (or otherwise associated with the object parameters), or output any other suitable output. In some embodiments, a neural network, such as a deep convolutional neural network associated with the image processor or another neural network, processes the batched inputs by using them as data for an image processing task or tasks, such as object detection and object location prediction. Neural networks are commonly designed to process batched inputs in order to generate batched outputs. In some embodiments, this processing is optimized such that the processing is performed faster than performing the detection twice on the two separate images. In some embodiments, only one set of weights for the neural network needs to be loaded into the neural network, resulting in increased speed and efficiency. In some embodiments, one or more techniques related to parallelism are employed in processing the batched input.

The method can optionally include: combining the outputs associated with each image (example shown in FIG. 4), which functions to generate a composite output with high object detection fidelity in the region corresponding to the priority FOV.

In one variation, combining the outputs includes combining the detected objects from the high-resolution image and the low-resolution image into one representation (e.g., virtual representation, 3D point cloud, matrix, image, etc.). In one embodiment of this variation, combining the detected objects includes: scaling the detected objects; and removing duplicate detections. However, the detected objects can be otherwise combined.

Scaling the detected object can include: identifying a detected object; determining a predetermined size (e.g., box size) associated with the detected object's classification; and scaling the detected object to the predetermined size. Alternatively, scaling the detected object can include: determining the physical or image location of the detected object (e.g., the y-location of the detected object); determining a predetermined size associated with the detected object location, and scaling the detected object to the predetermined size. Alternatively, scaling the detected objects can include: scaling the high-resolution crop's detected objects down (or the low-resolution image's detected objects up) based on the scaling factor between the high-resolution crop (priority FOV) and the full image. However, the detected objects can be otherwise scaled.

This embodiment can optionally include aligning the output from the high-resolution crop with the output of the low-resolution image during output combination. The outputs are preferably aligned based on the location of the high-resolution crop (priority FOV) relative to the full image, but can be otherwise aligned. The outputs are preferably aligned after scaling and before duplicate removal, but can alternatively be aligned before scaling, after duplicate removal, or at any suitable time.

Duplicate detections may be removed or merged from the combined, scaled output, but can alternatively or additionally be removed from the individual outputs (e.g., wherein the duplicate-removed outputs are subsequently combined), or be removed at any other suitable stage. Removing duplicate detections can include: applying non-maximum suppression (NMS) to the combined outputs (e.g., based on clustering, such as greedy clustering with a fixed distance threshold, mean-shift clustering, agglomerative clustering, affinity propagation clustering, etc.); matching pixels (e.g., using Hough voting); using co-occurrence methods; by identifying and consolidating overlapping detections; using unique object identifiers (e.g., considering a first and second vehicle—sharing a common license plate, color, or other set of parameters—detected in the high-resolution crop and the low-resolution image as the same vehicle); based a score or probability (e.g., calculated by a second neural network or other model); or otherwise identifying and merging duplicate detections.

As illustrated in FIG. 4, a first bounding box is positioned around a vehicle in the crop and a second bounding box is positioned around a vehicle in the full image. As described above, the system may determine that the first bounding box and second bounding box are positioned around a same real-world object (e.g., the vehicle). Since the first bounding box may, as an example, more closely adhere to a contour of the vehicle, the second bounding box may be removed as a duplicate. That is, an accuracy associated with detecting objects, assigning bounding boxes or other location information, and so on, may be greater for the crop.

In some embodiments, the batched image includes the cropped image combined into the larger downsampled image, resulting in potential situations in which bounding boxes for objects appearing at the edge of the frame (in the cropped image). In some embodiments, the detector (e.g., object detector used to detect objects in the high-resolution cropped image and/or the low-resolution full image) is trained on a set of images in which bounding boxes at the edge of the frame require guessing as to the full extent of the objects inside of them. In some variants, detection algorithms which predict the box to the edge of the frame can be insufficient, as such algorithms would lead to incorrect results when used in this fashion. For example, in some embodiments, the cropped image may include a car that has been cropped in half; an estimate or determination of the full extent of the car can be needed to properly match, merge, and/or de-duplicate said car from the cropped image with the same car detected in the full image. In some embodiments, the neural network is trained to predict the full extent of the car, based on a training set of objects such as other cars that have been cropped in half.

Figure 3:
FIG. 3 is an illustration of an example of cropped objects in bounding boxes, according to an embodiment of the object detection method.

FIG. 3 is an illustration of an example of cropped objects in bounding boxes, according to an embodiment of the object detection method. The image 300 depicts a cropped field of view. The car object at the lower left edge of the frame is cropped such that it does not show the full car, and likewise for the car object art the right edge of the frame.

In some embodiments, the neural network is trained on images similar to image 300 such that the neural network is trained to predict the full extent of the car objects in image 300, and thus generates an accurate result in the form of object identification and object location detection. Training a neural network is the process of finding a set of weights and bias values such that computed outputs closely match the known outputs for a collection of training data items. Once a qualifying set of weights and bias values have been found, the resulting neural network model can make predictions on new data with unknown output values. In some embodiments, training data for predicting the full extent of car objects includes images in which a car object is not fully visible within a frame as well as images in which car objects are fully visible within the frame.

In some embodiments, the neural network is trained using a batch method, wherein the adjustment delta values are accumulated over all training items to produce an aggregate set of deltas. The aggregated deltas are applied to each weight and bias. In some embodiments, the neural network is training using an online method, wherein weights and bias values are adjusted for every training item based on the difference between computed outputs and the training data target outputs. Any other method or methods of training neural networks can be used to predict the full extent of the car objects in image 300.

Example Image

An example embodiment of the object detection method follows. In the example, a heuristic is used to determine priority field of view for a received image. The priority field of view is cropped, then batched with a downsampled image. The boxes of objects are combined in post-processing. Further details on these steps are provided below.

First, according to a heuristic retrieved from the heuristics database 110, system 100 determines a horizon line based on gyroscope data generated by one or more sensors within an autonomous vehicle. Map data, (e.g., offline or online maps, such as OpenStreetMaps), may be used, optionally along with compass data, to determine a vehicle heading and future road direction. System 100 receives a 1920×1080 image from a forward facing camera in the autonomous vehicle. A 640×360 region of the image is cropped, depicting a region where the road is expected to be in 100 meters. The original image is downsampled to 640×360, the same dimensions as the cropped image. The two images are batched and fed into the detector, wherein the detector can output the images annotated with labeled bounding boxes (windows). The bounding boxes of the objects are combined by scaling them appropriately. Non-maximal suppression techniques are then used by system 100 to remove any duplicate object detections.

The result of this example is that nine times the pixel count in the high priority field of vision can be processed in the detector, resulting in an increase of three times the distance of the farthest object detected. The computational increase is twice the amount, but in practice this is commonly less, due to a sub-linear computational increase when the images are batched, since the computation is more parallelizable than it otherwise would have been. Thus, a low compute, long range object detection is achieved in the example as a result of the methods and techniques described herein.

Example Block Diagrams

As will be described below, in some embodiments a machine learning model may be used to determine a particular field of view of an image. For example, a machine learning model may be leveraged which identifies a vanishing line, horizon line, portion of a road, and so on. In this example, a crop of the image may be obtained based on the identification. As described herein, the crop may include information which may be considered particular advantageous for use in autonomous operation of a vehicle. For example, cars, pedestrians, and so on, may be included in this crop. As an example, since the crop may be based on a vanishing or horizon line, as may be appreciated other vehicles or pedestrians may tend to be clustered in this field of view. Thus, it may be advantageous for this portion to be enhanced.

The description above focused on the above-described portion being analyzed by one or more machine learning models at greater than a threshold resolution. Remaining portions of an image may be analyzed at a downsampled, or reduced, resolution. Thus, the portion associated with the particular field of view may be analyzed at a greater level of detail while limiting an extent to which compute resources are required.

As will be described below, with respect to FIGS. 5A-5B, in some embodiments the above-described portion may be analyzed by one or more subsequent machine learning models. For example, a convolutional neural network may be used to extract features from this portion of an image. These features may thus be associated with the particular field of view, such as associated with a vanishing line or horizon line. Advantageously, the features may be combined (e.g., concatenated) with features determined from an entirety of the image. A subsequent machine learning model may then analyze the combined features to determine output information. As described above, output information may indicate particular classified objects, location information, bounding box information, and so on.

In this way, subsequent processing may occur for the particular field of view. A multitude of machine learning models, such as convolutional neural networks, may be trained (e.g., end-to-end training) to leverage this subsequent processing. Thus, the portion of an image which may tend to include other vehicles, pedestrians, signs, and so on, may advantageously be further analyzed.

The description of FIGS. 5A-5B below, will focus on analyzing an input image 502. For example, the input image 502 may be analyzed during operation of the vehicle. Thus, the machine learning models described below may be trained. As may be appreciated, the vehicle, or another system, may perform training of the machine learning models. For example, backpropagation techniques may be employed to train the models.

Figure 5A:
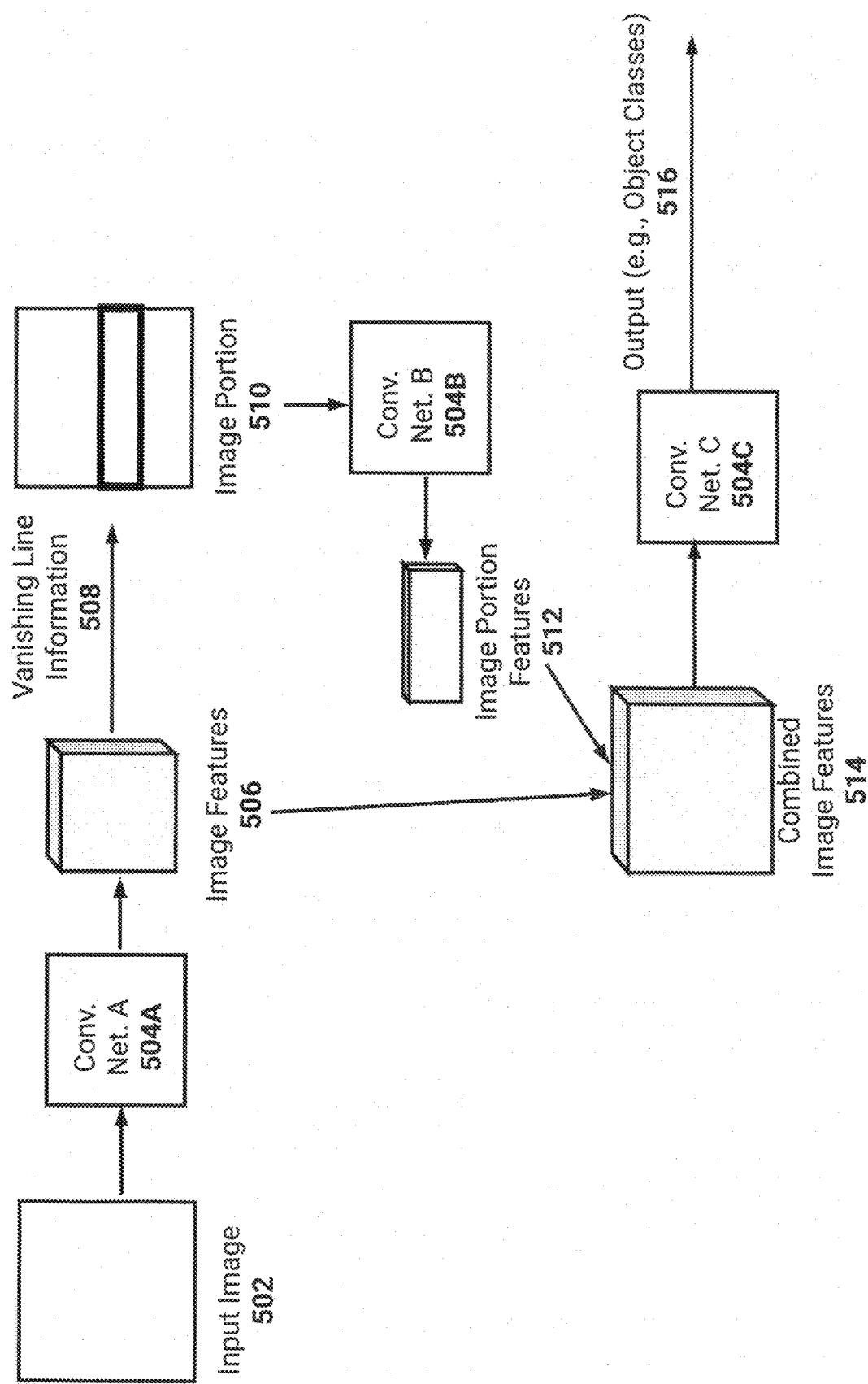
FIG. 5A illustrates a block diagram of an example technique for object detection.

FIG. 5A illustrates a block diagram of an example technique for object detection. In the illustrated example, three convolutional neural networks 504A-504C are included. These convolutional neural networks 504A-504C may be used to determine output information 516, such as detected objects, for use in autonomous navigation, driving, operation, and so on, of a vehicle. As described herein, the convolutional neural networks 504A-504C may be implemented by a system of one or more processors or computers, one or more application-specific integrated circuits (ASICs), and so on.

An input image 502 may be provided to convolutional neural network (CNN) A 504A. A forward pass through CNN A 504A may be performed, and image features 506 may be determined. The image features 506 may represent feature maps. For example, the input image 502 may be of size [832, 1024, 3] (e.g., height, width, color channels). In this example, the image features 506 may be of size [26, 40, 512] features. Based on the image features 506, vanishing line information 508 may be determined for the input image 502.

As an example, CNN A 504A may be trained to extract features via convolutional layers. CNN A 504A may optionally further include one or more dense or fully-connected layers to identify a y-coordinate which corresponds to a vanishing line, horizon line, or other field of view. As another example, a subsequent machine learning model, or other classifier, may analyze the image features 506 and identify the vanishing line information 508. In some embodiments, CNN A 504A or another model or classifier may be trained to identify the vanishing line information 508. For example, labels associated with images may be identify y-coordinates, or other locations, of respective vanishing lines in the images. In this way, the vanishing line information 508 may be identified.

An image portion 510 of the input image 502 may be identified based on the vanishing line information 508. For example, the vanishing line information 508 may indicate a y-coordinate. In this example, a crop may be obtained based on the y-coordinate. For example, a rectangle from the image may be cropped. The rectangle may optionally extend a first threshold distance above the y-coordinate and a second threshold distance below the y-coordinate. The rectangle may optionally extend along an entirety of a horizontal axis of the input image 502. In some embodiments, the rectangle may optionally encompass extend along a particular length of the horizontal axis. Thus, less than the full horizontal axis of the input image 502 may be cropped. With respect to an example the input image 502 being of size [832, 1024, 3], and the y-coordinate being at row 500 from the top, the image portion 510 may be a horizontal stripe of size [256, 1024, 3].

A forward pass of the image portion 51 may then be performed through CNN B 504B. Image portion features 512 may then be obtained based on this forward pass. With respect to the horizontal stripe being [256, 1024, 3], the image portion features 512 may be features of size [8, 40, 512]. The image portion features 512 may be combined with image features 506 to generate the combined image features 514. For example, the two features 512, 506, may be fused together by spatially contacting them along the channel dimension (e.g. the features may be concatenated). With respect to the example above, the resulting combined image features 514 may be of size [26, 40, 1024].

The image portion features 514 may be placed into a correct location (e.g., of the combined image features 514) spatially based on the location of the vanishing line information 508. A remainder may be padded with zeroes. In the example above of the vanishing line information 508 being at row 500, and the features being reduced in size by a fraction of 32, the features may be placed 16 rows down and may fill in the next 8 rows. As described above, a remainder may thus be padded.

The combined image features 514 may then be provided to CNN C 504C. This model 504C may be used to determine output information 516. As described above, output information 516 may include detected objects (e.g., classified objects), bounding boxes about each detected object, location information for the detected objects, and so on.

In this way, there may be no explicit merging of bounding boxes from two scales at the end. The merging may be implicit and done inside the CNNs. Thus, the field of view described above in FIGS. 2-4, may be labeled by the techniques described in FIG. 5A. A portion of the image 502 associated with this field of view may then be further analyzed by CNN B 504B. Thus, CNN C 504C may have the advantage of information identifying specific image features for the portion, which are concatenated, with image features for the input image. The CNNs A-C 504A-504C may be trained to enhance an accuracy associated with detecting objects within the field of view.

Figure 5B:
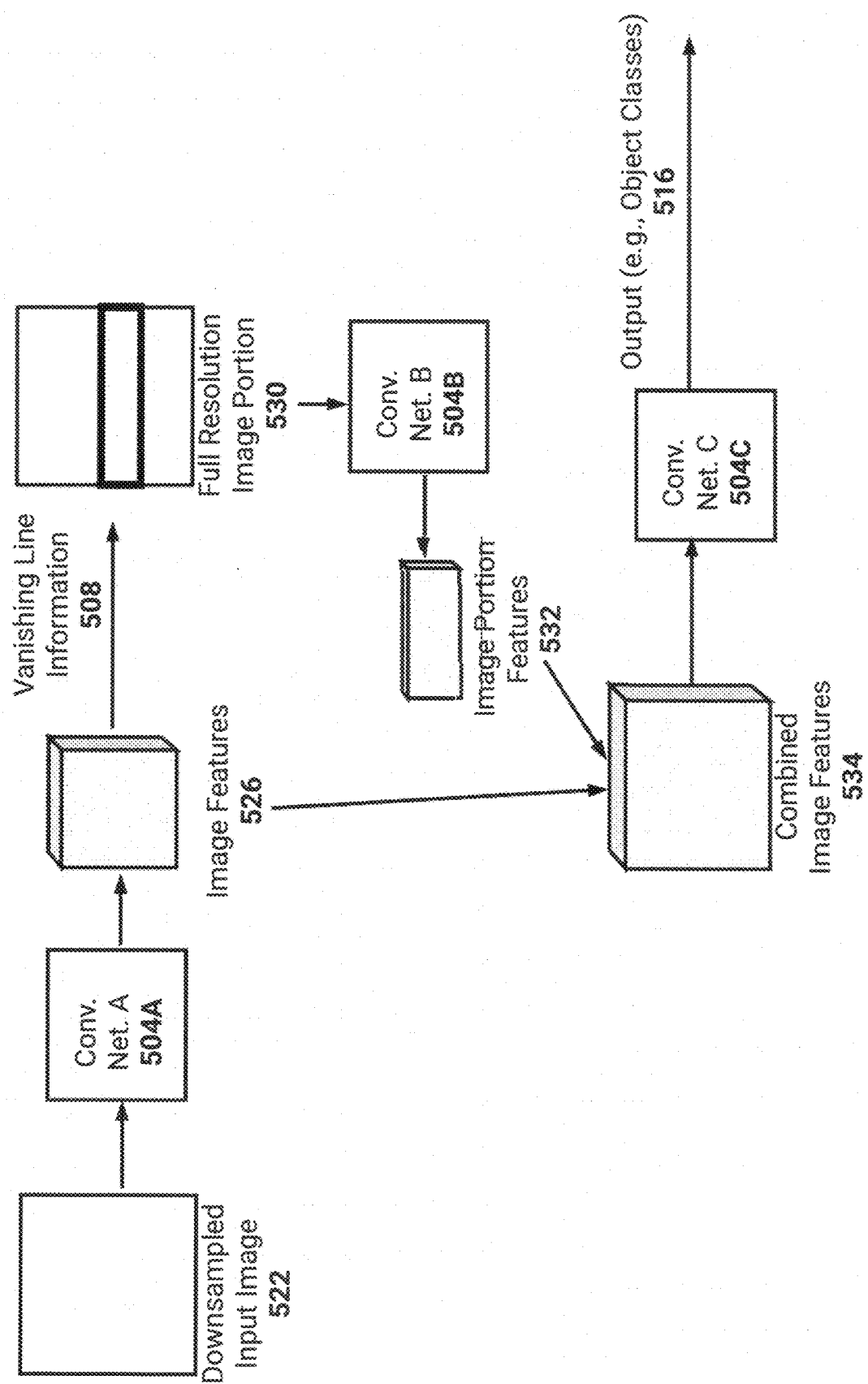
FIG. 5B illustrates a block diagram of another example technique for object detection.

FIG. 5B illustrates a block diagram of another example technique for object detection. In some embodiments, the input image 502 identified above may be downsampled. For example, vanishing line information 508 for a downsampled image 522 may be identified. An image portion 530 associated with the vanishing line information 508 may be cropped. Advantageously, the image portion 530 may be cropped from a full resolution version of the image 522. Image portion features 532 may then be obtained, and concatenated with image features 526 associated with the downsampled image 522. In some embodiments, the image portion features 532 may be used in place of a corresponding portion of the image features 526. For example, a portion of the image features 526 associated with the vanishing line may be replaced.

The combined image features 534 may then be provided to CNN C 504C, and output information 516 determined. In this way, FIG. 5B leverages downsampling of an input image 502 for portions of the image 502 not associated with a particular field of view.

Other Embodiments

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method implemented by a system of one or more processors, the method comprising:
    obtaining an image from an image sensor of one or more image sensors positioned about a vehicle;
    determining a field of view for the image, the field of view being associated with a vanishing line;
    generating, from the image, a crop portion corresponding to the field of view, and a remaining portion, wherein the remaining portion of the image is downsampled; and
    outputting, via a convolutional neural network, information associated with detected objects depicted in the image, wherein detecting objects comprises performing a forward pass through the convolutional neural network of the crop portion and the remaining portion.

2. The method of claim 1, wherein the output information comprises one or more objects classified in the image and location information associated with the objects, and wherein the output information is configured for use in autonomous driving of the vehicle.

3. The method of claim 1, wherein a first forward pass through the convolutional network is performed for the crop portion, and wherein a second forward pass through the convolutional network is performed for the remaining portion, and wherein output information is determined based on the first forward pass and the second forward pass.

4. The method of claim 3, wherein the convolutional neural network detects a first object depicted in the crop portion and a second object depicted in the remaining portion corresponding to a same real-world object, and wherein the method further comprises:
    removing, from the output information, one of the first object or the second object.

5. The method of claim 4, wherein the second object is removed, the second object being associated with less accurate location information than the first object.

6. The method of claim 1, wherein the vanishing line is determined based on location information of a road depicted in the image.

7. The method of claim 1, wherein the vanishing line is determined based on map information and inertial measurement unit (IMU) information, and wherein the method comprises:
    identifying, based on the IMU, a horizon line; and
    determining, based on map information, a vehicle heading, wherein the crop portion represents corresponds with an expected location of the vehicle in a threshold period of time or a threshold distance.

8. A system comprising one or more processors and non-transitory computer storage media storing instructions that, when executed by the one or more processors, cause the one or more processors to perform operations comprising:
    obtaining an image from an image sensor of one or more image sensors positioned about a vehicle;
    determining a field of view for the image, the field of view being associated with a vanishing line;
    generating, from the image, a crop portion corresponding to the field of view and a remaining portion wherein the remaining portion of the image is downsampled; and
    outputting, via a machine learning model, information associated with detected objects depicted in the image.

9. The system of claim 8, wherein the output information comprises one or more objects classified in the image and location information associated with the objects, and wherein the output information is configured for use in autonomous driving of the vehicle.

10. The system of claim 9, wherein a first forward pass through the convolutional network is performed for the crop portion, and wherein a second forward pass through the convolutional network is performed for the remaining portion, and wherein output information is determined based on the first forward pass and the second forward pass.

11. The system of claim 10, wherein the convolutional neural network detects a first object depicted in the crop portion and a second object depicted in the remaining portion corresponding to a same real-world object, and wherein the operations further comprise:
    removing, from the output information, one of the first object or the second object.

12. The system of claim 11, wherein the second object is removed, the second object being associated with less accurate location information than the first object.

13. The system of claim 9, wherein the vanishing line is determined based on location information of a road depicted in the image.

14. The system of claim 9, wherein the vanishing line is determined based on map information and inertial measurement unit (IMU) information, and wherein the operations further comprise:
    identifying, based on the IMU, a horizon line; and
    determining, based on map information, a vehicle heading, wherein the crop portion represents corresponds with an expected location of the vehicle in a threshold period of time or a threshold distance.

15. Non-transitory computer storage media storing instructions that when executed by a system of one or more processors, cause the one or more processors to perform operations comprising:
    obtaining an image from an image sensor of one or more image sensors positioned about a vehicle;

determining a field of view for the image, the field of view being associated with a vanishing line;

generating, from the image, a crop portion corresponding to the field of view and a remaining portion, wherein the remaining portion of the image is downsampled; and outputting, via a machine learning model, information associated with detected objects depicted in the image.

16. The computer storage media of claim 15, wherein the output information comprises one or more objects classified in the image and location information associated with the objects, and wherein the output information is configured for use in autonomous driving of the vehicle.

17. The computer storage media of claim 15, wherein a first forward pass through the convolutional network is performed for the crop portion, and wherein a second forward pass through the convolutional network is performed for the remaining portion, and wherein output information is determined based on the first forward pass and the second forward pass.

18. The computer storage media of claim 17, wherein the convolutional neural network detects a first object depicted in the crop portion and a second object depicted in the remaining portion corresponding to a same real-world object, and wherein the operations further comprise:

removing, from the output information, one of the first object or the second object.

19. The computer storage media of claim 18, wherein the second object is removed, the second object being associated with less accurate location information than the first object.

20. The system of claim 9, wherein the vanishing line is determined based on map information and inertial measurement unit (IMU) information, and wherein the operations further comprise:

identifying, based on the IMU, a horizon line; and determining, based on map information, a vehicle heading, wherein the crop portion represents corresponds with an expected location of the vehicle in a threshold period of time or a threshold distance.

* * * * *

UNITED STATES PATENT AND TRADEMARK OFFICE
CERTIFICATE OF CORRECTION

PATENT NO. : 11,537,811 B2
APPLICATION NO. : 16/703660
DATED : December 27, 2022
INVENTOR(S) : Anting Shen It is certified that error appears in the above-identified patent and that said Letters Patent is hereby corrected as shown below:

In the Claims

Column 16, Line 34, Claim 10, delete "claim 9," and insert -- claim 8, --.

Column 16, Line 50, Claim 13, delete "claim 9," and insert -- claim 8, --.

Column 16, Line 53, Claim 14, delete "claim 9," and insert -- claim 8, --.

Column 18, Line 12 (approx.), Claim 20, delete "The system of claim 9," and insert -- The computer storage media of claim 15, --.

Signed and Sealed this
Eleventh Day of April, 2023

Katherine Kelly Vidal
*Director of the United States Patent and Trademark Office*